Patented Mar. 19, 1929.

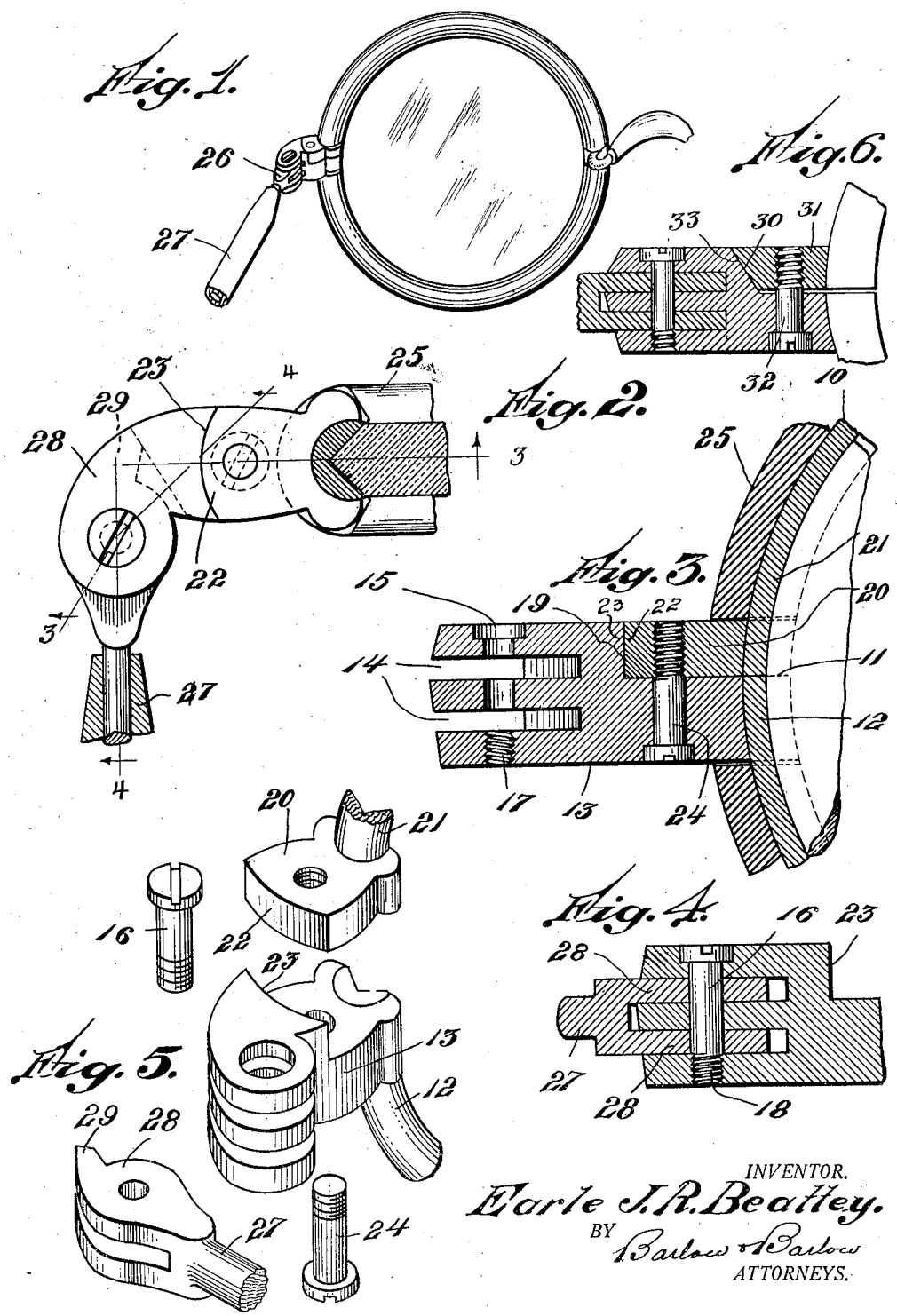

1,706,343

UNITED STATES PATENT OFFICE.

EARLE J. R. BEATTEY, OF EDGEWOOD, RHODE ISLAND, ASSIGNOR TO UNIVERSAL OPTICAL CORPORATION, OF PROVIDENCE, RHODE ISLAND, A CORPORATION OF RHODE ISLAND.

OPHTHALMIC MOUNTING.

Application filed January 28, 1926. Serial No. 84,343.

This invention relates to an improved construction of ophthalmic mountings; and has for its object to provide an improved construction of end-piece for the eye wire of the mounting wherein one end of the split or separable eye wire is provided with a single end-piece having a temple joint formed therein and to provide the opposite end of the wire with an ear member having a binding screw for securing this ear to the end-piece to bind the lens separately and independently of the joint screw, whereby either the temple or the lens may be adjusted or removed independently and without disturbing the adjustment of the other.

A further object of this invention is a provision of an end-piece which is matched or recessed for a portion of its length to receive the ear member on the opposite end of the wire, the end wall of the recess serving as an abutment to cooperate with the attaching screw for securing and retaining the ear member in set position on the end-piece.

With these and other objects in view, the invention consists of certain novel features of construction, as will be more fully described, and particularly pointed out in the appended claims.

In the accompanying drawings:

Figure 1 is a perspective view showing my improved type of end-piece on the eye wire.

Figure 2 is a top view with the eye wire sectioned just above its ear member and showing the temple member as joined to the end-piece.

Figure 3 is a central sectional elevation showing the construction whereby the screw in the temple joint acts entirely independently of the lens clamp screw.

Figure 4 shows a sectional elevation of the joint clamp screw as connecting the temple to the end-piece independently of the joint screw.

Figure 5 is a dissembled group of the end-piece parts and showing both the temple and the joint portion and lens clamp ear removed from the end-piece.

Figure 6 is a modification illustrating both the end wall of the notch and that of the ear as beveled and a screw for binding the beveled walls together.

It is found in the practical construction and operation of ophthalmic mountings of this character, of advantage to provide a single end-piece fixed to one end of the separable eye wire and to form a complete temple joint at the outer end of this end-piece; also to provide a separate lens clamp ear on the opposite end of the eye wire so formed as to be attached to the end-piece by a separate screw independently of the temple joint screw, whereby the lens may be inserted and removed without destroying the joint adjustment; and on the other hand, the joint screw may be adjusted to provide the required friction to the temple joint without disturbing the lens clamp adjusting screw. Then again, by this construction the joint portion of the end-piece may be milled out of solid stock thereby obtaining a much more accurately formed and better wearing joint than where the end-piece is split through the joint. Also, by this construction by simply setting up the joint screw, any wear in the joint may be taken up and any desired amount of friction to the swing of the temple may be obtained at the joint.

Further, by this construction, it is very simple and practical to form a temple joint with a plurality of slots and a plurality of leaves or vanes on the temple end to fit the corresponding slots in the end-piece so as to provide double the frictional area at the joint than where the single leaf or vane at the joint is employed; and the following is a detailed description of the present embodiment of my invention and showing one construction of end-piece and temple joint by which these advantageous results may be accomplished:—

With reference to the drawings, 10 designates a separable eye wire which is radially split at 11 one end portion 12 of this eye wire being provided with a single end-piece 13 which is slotted as at 14 adjacent its outer end and to provide a temple joint. This end-piece is drilled as at 15 for the reception of the temple joint screw 16 and is tapped at its lower end 17 to receive the threaded portion 18 of its screw.

In order to preserve the joint end portion of this end-piece in a single piece, I have recessed or notched the opposite end thereof as at 19 for a portion of its length and I have preferably formed its end wall 23 on the arc of a circle by an end milling operation.

The end wall 22 of this clamp ear 20 is also preferably formed on the arc of a circle to fit or engage the correspondingly shaped end wall 23 of the recess, which wall serves as an abutment for the end of the ear to cooperate with the lens clamp screw 24 thereof which is threaded into this clamp ear, to bind the ear in the recess and hold it firmly against movement therein.

This eye wire may be covered by a nonmetallic rim 25 if desired.

In forming my improved joint portion 26 of the temple 27, I preferably provide a pair of thin leaves or vanes 28 at the joint which are adapted to fit closely into the slots 14 in the end-piece, and the screw 24 is passed through the bore 15 and is threaded at its lower end 17 in the end-piece.

This screw may be set up to provide any desired tension between the leaves of the end-piece and the leaves of the temple joint so as to provide any desired amount of friction between these two members.

This temple joint is provided with a forwardly extending stop 29 which limits its outward swing.

It is found in practice of advantage to form the end wall 33 of the notch in the end piece on a bevel or incline and also to form the end wall 30 of the ear 31 as illustrated in Figure 6, on an incline, the thickness of this ear being preferably a little less than the depth of the notch and the inclined walls or surfaces are caused to abut just before the ear bottoms in its recess at which time the screw holes in the end piece and ear are in axial alignment, whereby the binding action of the screw 32 causes the ear to move endways slightly to throw these complemental screw holes out of alignment to bind and lock the screw in its holes and at the same time bind the beveled end walls together to positively prevent looseness or motion thereof and to also bind the lens in its eyewire.

My improved ophthalmic mounting is very simple and practical in construction and effective in its operation and by its use the lens may be inserted or removed or adjusted by simply operating the clamp screw 24 without disturbing the adjustment of the joint or its screw 16.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. An ophthalmic mounting having an eye wire split on its outer side, a recessed end piece carried on one end of the eye wire, an attaching ear carried by the other end of the eye wire fitting into said recess, the end portion of said ear and that of the recess being beveled, said ear being of a length and thickness to cause its beveled end to engage that of the recess before it bottoms in said recess, said endpiece and ear having complemental screw holes in axial alignment when the endpiece is slightly spaced from the bottom of the recess, and a binding screw in said holes for drawing said ear down into said recess causing said ear to slide endways inwardly on said bevel to grip the lens to bind the screw and also firmly bind said ear in its recess.

2. An ophthalmic mounting having an eye wire split on its outer side, a notched end piece carried on one end, an attaching ear carried by the other end of the eye wire fitting into said notch, the end portion of the ear and the end wall of the notch being beveled, said ear being of a length and thickness to cause its end to engage the beveled end wall of said notch before bottoming in said recess, said ear and end piece having holes in axial alignment when the endpiece is slightly spaced from the bottom of the recess, and a binding screw in said holes for drawing said ear down into said notch causing a relative endways movement of said ear and end piece to move said holes out of axial alignment and to bind and lock the screw therein.

In testimony whereof I affix my signature.

EARLE J. R. BEATTEY.